(12) United States Patent
Agrawal et al.

(10) Patent No.: US 6,721,331 B1
(45) Date of Patent: Apr. 13, 2004

(54) METHOD AND APPARATUS FOR DECENTRALIZED PRIORITIZED SCHEDULING IN A CSMA/CA WIRELESS SYSTEM

(75) Inventors: Prathima Agrawal, New Providence, NJ (US); Parameswaran Ramanathan, Madison, WI (US); Cormac John Sreenan, Carrigadromid (IE)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/461,924

(22) Filed: Dec. 15, 1999

(51) Int. Cl.$^7$ ............................................. H04L 12/413
(52) U.S. Cl. ..................................................... 370/448
(58) Field of Search ................................. 370/445, 446, 370/447, 448, 461, 462

(56) References Cited

U.S. PATENT DOCUMENTS

| | | | |
|---|---|---|---|
| 4,271,507 A | | 6/1981 | Gable et al. |
| 4,809,257 A | | 2/1989 | Gantenbein et al. |
| 5,210,753 A | | 5/1993 | Natarajan |
| 5,329,531 A | | 7/1994 | Diepstraten et al. |
| 5,394,433 A | | 2/1995 | Bantz et al. |
| 5,422,887 A | * | 6/1995 | Diepstraten et al. ........ 370/448 |
| 5,436,903 A | * | 7/1995 | Yang et al. ................. 370/448 |
| 5,555,260 A | | 9/1996 | Rinnback et al. |
| 5,592,623 A | | 1/1997 | Kurobe |
| 5,636,223 A | * | 6/1997 | Reardon et al. ............. 370/431 |
| 5,706,430 A | | 1/1998 | Yanagisawa et al. |
| 5,726,984 A | | 3/1998 | Kubler et al. |
| 5,742,593 A | | 4/1998 | Sharony et al. |
| 6,434,112 B1 | * | 8/2002 | Kwon ........................ 370/216 |
| 6,501,764 B1 | * | 12/2002 | Fudatate et al. ............ 370/445 |
| 6,522,661 B1 | * | 2/2003 | Min ............................ 370/445 |

FOREIGN PATENT DOCUMENTS

| JP | 59204347 A | * | 11/1984 | ........... H04L/11/00 |
|---|---|---|---|---|

OTHER PUBLICATIONS

The effect of exerting adequate persistence in collision avoidance protocols; Garcia–Luna–Aceves, J.J.; Tzamaloukas, A.; Mobile Multimedia Communications, 1999. (MoMuC '99) 1999 IEEE International Workshop on , 1999; Page(s): 328–337.*

IEEE Standard 802.11, "Wireless LAN Medium Access Control (MAC) and Physical Layer (PHY) Specifications," Nov. 1997, Chapter 9, pp. 71–99.

* cited by examiner

Primary Examiner—Chau Nguyen
Assistant Examiner—Jasper Kwoh

(57) ABSTRACT

A method and apparatus provide decentralized prioritized scheduling of wireless access in a carrier sense multiple access with collision avoidance (CSMA/CA) wireless local area network (LAN) is presented. Prior to and during data packet transmissions, a device station in the CSMA/CA wireless LAN continuously monitors transmission traffic in the bandwidth medium of the wireless LAN to determine whether the delay associated with pre-transmission of a data packet, due to the collision avoidance protocol in the CSMA/CA wireless LAN, exceeds the time frame in which the device station necessarily must transmit the data packet. If the delay is too great for the type of data packet to be transmitted, the device station decreases the possible range of the back-off duration of the collision avoidance protocol. Thus, the station device can increase its transmission priority by decreasing the randomly selected back-off duration range of values.

3 Claims, 4 Drawing Sheets

```
ALGORITHM FOR ADAPTING THE VALUE OF bi
ALGORITHM Adapt_b
/* b_prev   Decision on b_ in the previous invocation */
/* prev_util   Utility of stream i in the previous invocation *
/* curr_util   Current utility of stream i */
If curr_util sufficiently greater than prev_util then
        util_change = BETTER;
Elseif curr_util sufficiently less than prev_util then
        util_change = WORSE;
Elseif curr_util not sufficiently different from prev_util then
        util_change = SAME;
EndIf
If (b_prev = UP) and (util_change = BETTER) then
        Increase bi; b_curr = UP;
If (b_prev = UP) and (util_change = WORSE) then
        Decrease bi; b_curr = DOWN;
If (b_prev = UP) and (util_change = SAME) then
        Do not change bi; b_curr = SAME;
If (b_prev = DOWN) and (util_change = BETTER) then
        Decrease bi; b_curr = DOWN;
If (b_prev = DOWN) and (util_change = WORSE) then
        Increase bi; b_curr = UP;
If (b_prev = DOWN) and (util_change = SAME) then
        Do not change bi; b_curr = SAME;
If (b_prev = SAME) and (util_change = BETTER) then
        Do not change bi; b_curr = SAME;
If (b_prev =SAME) and (util_change = WORSE) then
        Decrease bi; b_curr = DOWN;
If (b_prev = SAME) and (util_change = SAME) then
        If bi has not been changed for a while then
                Increase bi; b_curr = UP;
        Else
                Do not change bi; b_curr = SAME;
b_prev = b_curr;
prev_util = curr_util
End.
```

FIG. 4

ALGORITHM FOR ADAPTING THE VALUE OF bi

ALGORITHM Adapt _b

/* b_prev   Decision on b_ in the previous invocation */
/* prev_util   Utility of stream i in the previous invocation */
/* curr_util   Current utility of stream i */

If curr_util sufficiently greater than prev_util then
    util_change = BETTER;
ElseIf curr_util sufficiently less than prev_util then
    util_change = WORSE;
ElseIf curr_util not sufficiently different from prev_util then
    util_change = SAME;
EndIf If (b_prev = UP) and (util_change = BETTER) then
    Increase bi; b_curr = UP;
If (b_prev = UP) and (util_change = WORSE) then
    Decrease bi; b_curr = DOWN;
If (b_prev = UP) and (util_change = SAME) then
    Do not change bi; b_curr = SAME;
If (b_prev = DOWN) and (util_change = BETTER) then
    Decrease bi; b_curr = DOWN;
If (b_prev = DOWN) and (util_change = WORSE) then
    Increase bi; b_curr = UP;
If (b_prev = DOWN) and (util_change = SAME) then
    Do not change bi; b_curr = SAME;
If (b_prev = SAME) and (util_change = BETTER) then
    Do not change bi; b_curr = SAME;
If (b_prev = SAME) and (util_change = WORSE) then
    Decrease bi; b_curr = DOWN;
If (b_prev = SAME) and (util_change = SAME) then
    If bi has not been changed for a while then
        Increase bi; b_curr = UP;
    Else
        Do not change bi; b_curr = SAME;
b_prev = b_curr;
prev_util = curr_util
End.

METHOD AND APPARATUS FOR DECENTRALIZED PRIORITIZED SCHEDULING IN A CSMA/CA WIRELESS SYSTEM

BACKGROUND OF THE INVENTION

1. Field of the Invention

The present invention relates to a method and apparatus for the scheduling of wireless access in a local area network (LAN) environment, and more particularly, to a method and apparatus for providing prioritized access in a carrier sense multiple access with collision avoidance (CSMA/CA) wireless LAN in which each terminal component of the LAN runs an independent priority protocol to prevent access collisions all without the necessity of a centralized infrastructure.

2. Description of the Art

As the deployment and use of indoor wireless data networks continues to grow, engineers are faced with a growing demand to run a mix of different devices/applications on these networks. The use of more devices/applications on a given network, however, creates a problem in that each of these different devices/applications is in conflict with the others over priority of transmission.

One proposed solution uses a centralized scheduler at the medium access control (MAC) layer to differentiate between classes of service offered to the devices/applications over the network. This idea evolved from the solution found in wire-line networks where different classes of service were provided along with signaling protocols to reserve network resources on a per-flow basis. It was extended to wireless LANs by the concept of reserving time slots on the shared wireless medium. To provide different classes of service, the centralized scheduler divides available bandwidth into two time periods. In the first period, stations contend for medium access using a random back-off to avoid collisions. In the second period, the centralized scheduler (typically located at the base station) offers contention-free access to selected terminals for a given number of time slots. Much of this work was in the context of a wireless asynchronous transfer mode (ATM), where slots can be reserved in response to ATM signaling messages associated with flows to/from the wireless stations. These types of systems use MAC-layer mechanisms like polling or token passing.

This solution, however, suffers from a number of problems. Having a MAC layer which provides both scheduled and contention-free periods is complex, increases access latency and decreases bandwidth utilization. Polling and token passing introduce overheads which can be significant relevant to the limited bandwidth capacity. This is due to extra packets or header fields for protocol information and latencies for exchanging state information, timeouts for lost tokens and stations out of range, etc. Thus, using a centralized scheduler prohibits the formation of so-called ad-hoc networks and has the using problems of scaling and reliability associated with centralized systems.

An alternative solution for wireless LANs, on the other hand, is the fundamental access method described in published IEEE 802.11 draft standard entitled "Wireless LAN Medium Access Control and Physical Layer specifications", 1997, and which is hereby incorporated by reference. The standard defines the specifications for wireless access for fixed, portable and moving stations on a LAN and gives two operative methods for doing so. The operative methods are based on what is referred to as carrier sense multiple access with collision avoidance (CSMA/CA) and operate by performing carrier sensing based on a channel assessment function provided by the physical layer (i.e., the interface of the devices/applications to be used/run over the network). Prior to transmission a station senses the medium. If the medium is not determined to be busy, the station monitors the medium for a specified amount of time. If the medium remains continuously idle during this time, then the station invokes a collision avoidance protocol. In the collision avoidance protocol, the station defers transmission of its packet for a randomly selected back-off duration. If no other station transmits during this back-off duration, then the station starts transmitting its packet. Otherwise, the station once again waits for the medium to become idle.

Unfortunately, however, this solution method is essentially only a "best-effort" service and thus does not fully take into account the delay sensitivity, bandwidth demands and error tolerance of traffic awaiting transmission at the individual devices.

SUMMARY OF THE INVENTION

Accordingly, the present invention allows for a method and apparatus having a decentralized prioritized scheduling of wireless access in which individual devices/applications can determine their own transmission priority based upon their data packet's delay sensitivity, bandwidth demand and error tolerance.

Each device/application in the CSMA/CA medium determines its own priority by running a modified distributed coordination function (DCF) in which a prioritized collision avoidance protocol is invoked. The prioritized collision avoidance protocol maintains a back-off timer for each flow, rather than on just a per-station basis, and, for each flow (and thus each back-off timer associated with that flow) associates a priority parameter. Each device/application in the CSMA/CA wireless LAN is thus able to select the most urgent of its' flows such that the highest priority flow back-offs for the shortest period of time. The priority parameter itself can be set, or adapted to the flow's priority, by invoking a back-off algorithm.

BRIEF DESCRIPTION OF THE DRAWINGS

FIG. 4 illustrates an example of an algorithm for adapting the value of the Priority parameter $b_i$ for use in the modified DCF to increase a devices/applications priority in the network, according to an embodiment of the present invention.

DETAILED DESCRIPTION

FIGS. 1 to 4 illustrate a method and apparatus for decentralized prioritized access in which a modified distributed coordination function (DCF) is run by a device/application in a CSMA/CA wireless LAN utilizing a MAC architecture.

Figure 1:
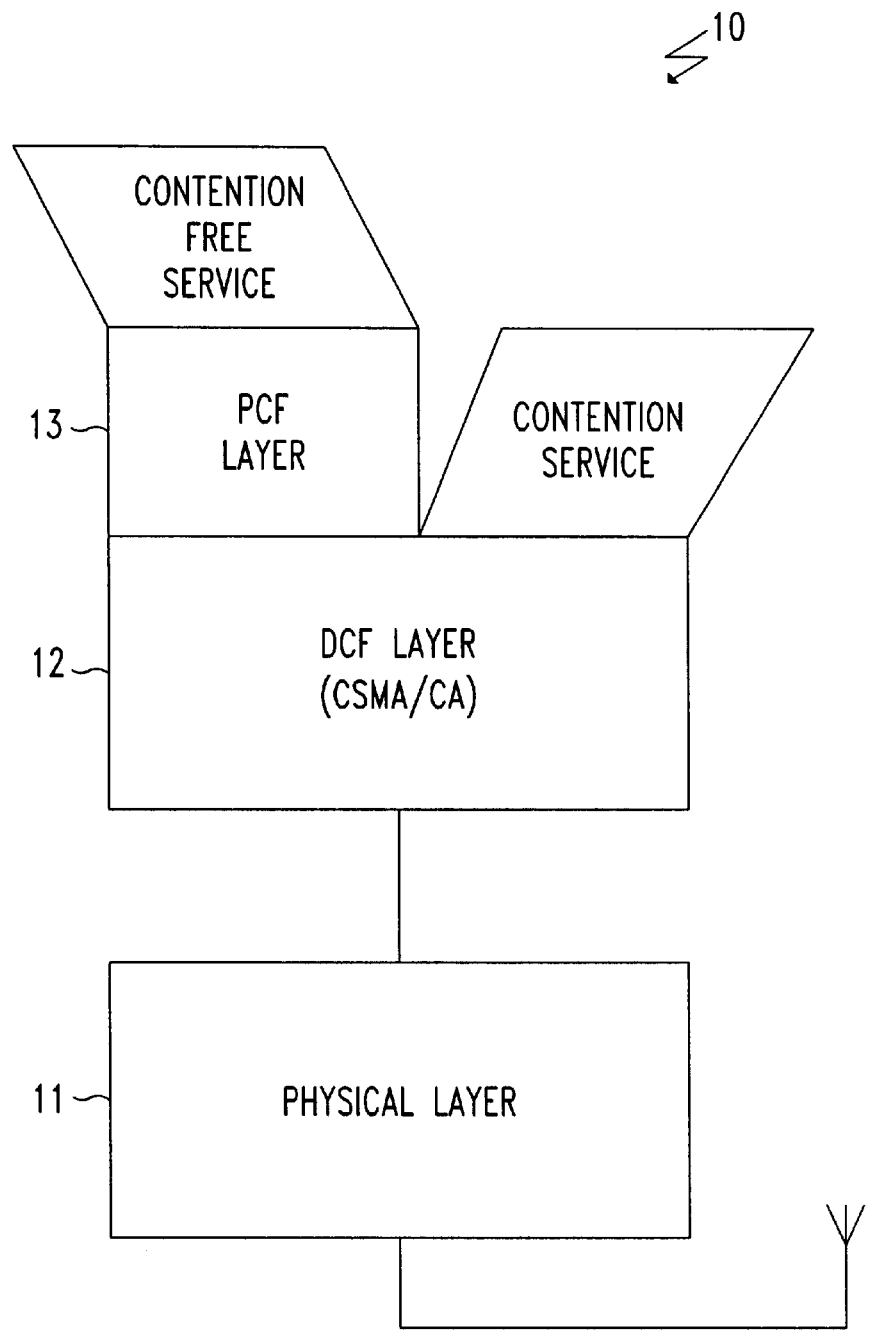
FIG. 1 illustrates a MAC architecture utilized in a CSMA/CA wireless LAN and which offers two modes of operation: the distributed coordination function (DCF) and the optional point coordination function (PCF), according to the prior art.

Referring to FIG. 1, a communication medium access control (MAC) layer architecture 10 utilized in a wireless LAN using either infrared, direct sequence or frequency hopping spread spectrum physical layers 11 is illustrated. The MAC layer architecture 10 is defined by the IEEE 802.11 draft standard entitled "Wireless LAN Medium Access Control and Physical Layer specifications", 1997, which, as mentioned above, is hereby incorporated by reference, and offers two modes of operation: the distributed coordination function (DCF) 12 and the point coordination function (PCF) 13. The DCF 12 is the fundamental access method and is based on carrier sense multiple access with collision avoidance (CSMA/CA) and is designed to support both contention and contention-free service. All stations (i.e., devices and/or applications), including access points if any, are required to implement DCF. The PCF 13 is an optional feature designed to support only contention-free services.

Figure 2:
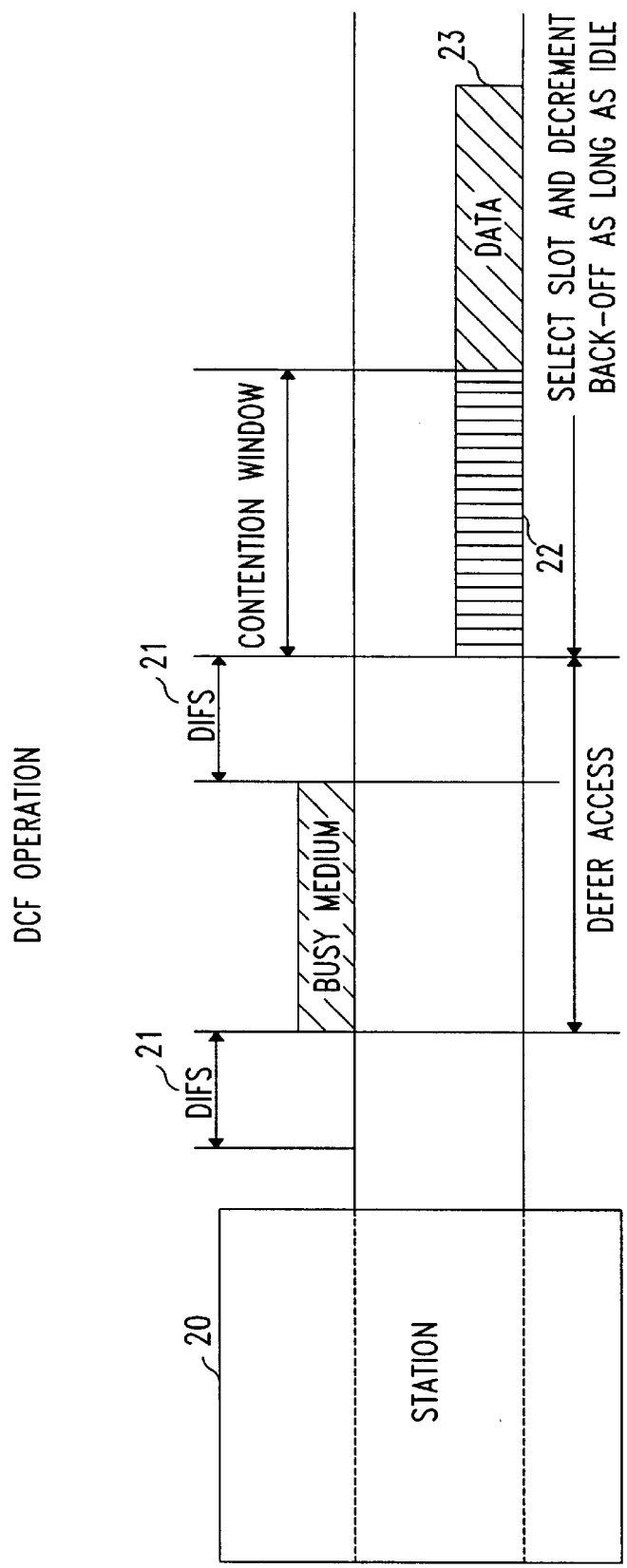
FIG. 2 illustrates a basic operation of the distributed coordination function (DCF) in the MAC architecture of FIG. 1, according to the prior art.

Referring to FIG. 2, the basic operation of the DCF layer 12 from FIG. 1 is illustrated in time line fashion. DCF implements collision avoidance by performing carrier sensing based on a channel assessment function provided by the physical layer 11. Prior to transmission a station 20 (i.e., a device and/or application) senses the medium. If the medium is not determined to be busy, the station 20 monitors the medium for a specified amount of time. Specifically, station 20 initially waits for a duration equal to a DCF inter-frame space (DIFS) 21 or extended inter-frame space (EIFS) (not shown), depending on whether the previous transmission was received correctly or not.

If the medium remains continuously idle during this time, then the station invokes a collision avoidance protocol. In the collision avoidance protocol, the station defers transmission of its packet for a randomly selected back-off duration 22. The back-off duration is maintained in a variable called the BackoffTimer. If the BackoffTimer has a non-zero value from a previous back-off invocation, then the same value is used as the back-off duration. Otherwise, a new value is chosen as follows:

BackoffTimer=Random (0, CW)*SlotTime where CW is another variable maintained by the station, Random(0, CW) is a function which returns an integer between 0 and CW, all with equal probability, and SlotTime is an attribute specifying the duration of a "slot" derived from the characteristics of the physical layer. The variable CW lies in the range ($CW_{min}$ to $CW_{max}$), where $CW_{min}$ and $CW_{max}$ are defined by the physical layer. CW is initially set to $CW_{min}$ and is incremented each time a transmission attempt fails, up to $CW_{max}$. CW is reset to $CW_{min}$ upon a successful transmission. Values for CW are sequentially ascending powers of 2, minus 1, giving an exponential increase and yielding an efficient back-off algorithm that is stable at high loads. While in the back-off period, the value in the BackoffTimer is decremented as long as the medium continues to remain idle. If the value of the BackoffTimer reaches zero and the medium is still idle, then the station starts transmitting its data packet 23.

However, if the medium becomes busy before the BackoffTimer becomes zero, the station stops decrementing it and saves the value for the next invocation. Once a medium is sensed to be busy the station once again waits for the medium to become idle. The medium is considered to be ready for a new packet transmission only if the medium is sensed to be continuously idle for a duration equal to DIFS or EIFS. The use of this random back-off procedure reduces the probability of collisions due to multiple stations simultaneously transmitting a frame after they all sense the medium to be idle.

Accordingly, in a DCF scheme each station is guaranteed equal access to the medium. This is fair and adequate, however, only if none of the streams have delay requirements. If some of the streams are in fact delay sensitive, then they may need a prioritized access to the medium as compared to streams which do not have delay requirements.

Figure 3:
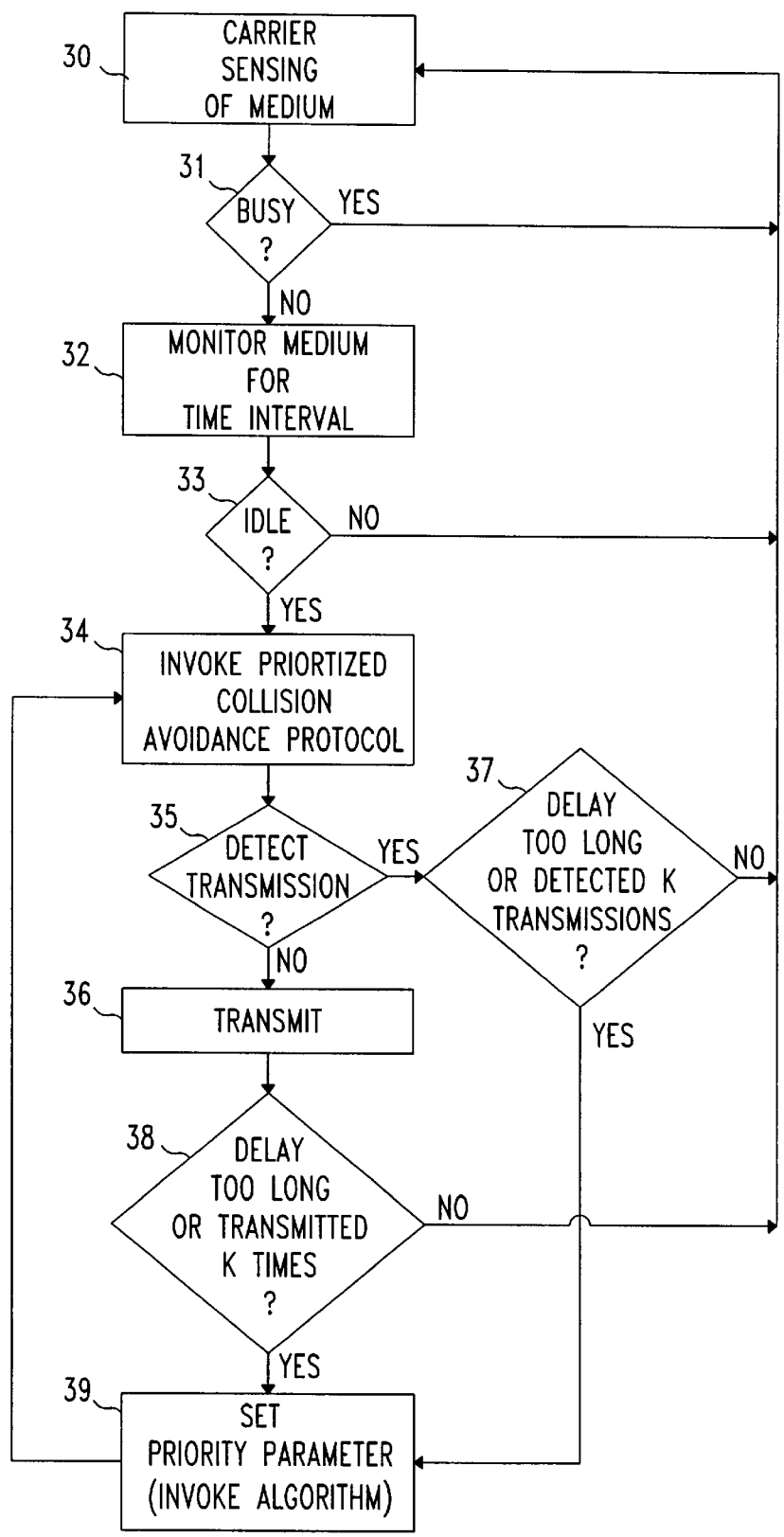
FIG. 3 illustrates a flow chart of a modified DCF to provide prioritized access in the CSMA/CA wireless LAN supported by the MAC architecture of FIG. 1, according to an embodiment of the present invention.

Thus referring now to FIG. 3, a modification of the IEEE 802.11's DCF scheme to support prioritized access to the communication medium is illustrated. In step 30, carrier sensing of the medium occurs. Carrier sensing can be provided by the physical layer 11 of the medium access control (MAC) architecture 10. The interface of the physical layer 11 can be either radio and/or infrared. The radio implementation of the physical layer employs either frequency-hopping spread spectrum or direct-sequence spread spectrum techniques. Carrier sensing can also be accomplished by the MAC via a virtual carrier sense mechanism. Thus, in step 31, the sensing functions of step 30 determine whether the medium is busy or not. If the medium is determined to be busy, the prioritized DCF scheme returns to step 30. If the carrier sensing functions of step 30 determine that the medium is not busy, then the modified DCF scheme continues to step 32.

In step 32, the MAC architecture 10, monitors the medium for a specified time interval. The specified time interval may be a DCF intraframe space (DIFS) and/or an extended intraframe space (EIFS), as previously mentioned above. It is to be understood, however, that the specified time interval is not to be limited to these intraframe spaces. Rather, any method of determining a time interval in which to sense the medium is acceptable. Thus, a station can determine when the medium is idle through the use of carrier sensing functions for any time interval specified.

Accordingly, in step 33, the modified DCF scheme determines whether the medium is idle or not. If the medium is not idle for the specified time interval, the modified DCF scheme returns to step 30 to continue with further carrier sensing. If, however, the medium is determined to in fact be idle, then the DCF scheme continues with the next step.

In step 34 then, the modified DCF scheme invokes a prioritized collision avoidance protocol. In the prioritized collision avoidance protocol, the station prioritizes each data flow (or stream) i, thus deferring transmission of its packet for only a limited back-off duration. To prioritize each flow/stream, rather than just on a per-station basis, the station associates a pair of parameters called Current Window (CW) and BackoffTimer (BT) with the flow/stream i. Furthermore, for each flow/stream i in the station, an additional two parameters, called Stream BackoffTimer ($SBT_i$) and Priority ($b_i$), are also associated. The SBTI represents the amount of back-off time a stream/flow i, as opposed to the corresponding station, will undertake to avoid collision. The Priority parameter $b_i$, on the other hand, represents the priority of flow/stream i relative to other flows/streams. Its value lies between the values 0 and 1, with a smaller value implying a higher priority and thus causing higher priority flows to back-off for shorter periods. Further, its value is adapted based on the service received by the flow/stream and an adaptation strategy for setting the value of $b_i$ is described in detail below.

The value of CW, however, is determined exactly as in the IEEE 802.11 draft standard. That is, its value lies in the range ($2^{k_{min}}-1$) to ($2^{k_{max}}-1$). Let us suppose that $CW=2^k-1$ for some $k_{min} \leq k \leq k_{max}$ when a station transmits a packet. If the station receives an acknowledgement for the packet, then CW is reset to $2^{k_{min}}-1$. Otherwise, CW is increased to min $\{2^{k-1}-1, 2^{k_{max}}-1\}$.

The value of BT is determined each time the channel changes from busy to idle (as sensed by the station). Specifically, $$BT=\min\{SBT_i: i \in Q\},$$

where Q is the set of backlogged streams in the station and $SBT_i$ is the value of the Stream BackoffTimer of stream i. The algorithm for determining $SBT_i$ is described in the next paragraph below. As in the IEEE 802.11 draft standard, BT is constantly decremented during the back-off period. If BT of a station reaches zero before the medium becomes busy, the packet from stream i=arg min$\{PT_i: i \in Q\}$ is transmitted by the station. Ties are broken in favor of streams with smaller value for $b_i$.

Lastly, each station maintains a Stream BackoffTimer for its backlogged streams. The value is modified at the start and the end of a backoff period. At the start of a backoff period, $SBT_i$ is reinitialized according to the following rule. If $SBT_i$ was zero at the end of the previous backoff period, then $SBT_i$ is reinitialized to $$SBT_i = \text{Random}(0, b_i) * CW * \text{SlotTime}.$$

Otherwise, it is reinitialied to its value at the end of the previous back-off period. At the end of a backoff period, $SBT_i$ is decremented by an amount an equal to the duration of the back-off period.

Having invoked the prioritized collision avoidance protocol, in step 35 the modified DCF scheme determines whether any transmissions have been detected during the back-off period. If not, then in step 36 the station transmits its data packet. If, however, a transmission is in fact detected during the back-off period, in step 37 the modified DCF scheme determines if the thresholds of the priority parameters of the station's data packet are being approached or have been exceeded (i.e., whether or not the data packet needs to be transmitted now or very soon).

Determination of whether a data packet's priority parameters are being approached or have been exceeded can be accomplished in a number of ways. For instance, the station, knowing the data packet's priority, can determine if the rate of packet transmissions from the station is too long, that is, based on previous transmissions (perhaps of like-priority packets) the station can determine if the delay of packet transmissions will be too long a delay for the specified priority of the data packet in question. Alternatively, the station can keep record of the number of packet transmissions (i.e., some number k transmissions) that have previously occurred and, knowing the data packet's priority, whether or not that data packet's priority is being approached or has been exceeded. It is to be understood, of course, that the method of determining whether a data packet's priority is being approached or exceeded is not to be limited to the methods herein disclosed and that other methods may in fact be utilized. Further, it is to be understood that these methods may be utilized separately or in conjunction with one another.

The same determination occurs in step 38, if in fact the data packet has been transmitted in step 36, except that the station makes the determination for other data packets (if any) waiting to be transmitted next.

In either case, if the priority parameter threshold is not being approached or has not been exceeded, then the modified DCF scheme being implemented by the station returns to step 30 for further carrier sensing of the medium. If, however, the priority parameter threshold is being approached or has been exceeded, then in step 39 the Priority parameter $b_i$ is re-set.

The Priority parameter $b_i$ can be set in a number of ways. One method is by developing a set of classes, where each class is characterized by a different value of $b_i$. The values of $b_i$ distinguish the delay requirements of the class such that classes with shorter delay requirements have a higher priority. A second method is one in which stations use a distributed strategy to dynamically adapt the value of $b_i$ for each respective stream/flow. One such distributed strategy is based on the theory of non-cooperative games. In this strategy, stations individually adapt the value of $b_i$ for each of their flows so as to maximize a given utility function. Referring to FIG. 4, an example of an algorithm for adapting the Priority parameter $b_i$ to increase a flow/stream's priority in the network according to a utility function is shown. In this manner the distributed strategy provides some minimizing of the deviation between the measured and the desired delay bounds for a flow/stream. Further, the distributed strategy permits choosing as large a value of b, as possible while still minimizing the aforementioned deviation.

For example, let Di be the average delay of the last k transmitted packets of flow i and let Dbar be the desired average delay for flow i. Then an example utility function for flow i is:

$$\begin{aligned}
\text{utility } i &= 1 & &\text{if } Di <= Dbar; \\
i &= (Di/Dbar)(2 - (Di/Dbar)) & &\text{if } Dbar < Di <= 2^*Dbar; \\
i &= 0 & &\text{otherwise.}
\end{aligned}$$

An intuitive explanation for this utility function is as follows. If Di <Dbar, then flow i is receiving better than desired service. Therefore, its utility is 1. On the other hand, if Di larger than Dbar, but say less than 2*Dbar, then flow i is receiving slightly worse than desire service. Therefore, its utility lies between 0 and 1, with a smaller utility representing worse service. Finally, if Di >2*Dbar (i.e., as represented by "otherwise" above), then the flow i is receiving far worse service than desired and its utility is 0.

Given such a utility function, the algorithm Adapt_b as shown in FIG. 4 can be intuitive explained as follows. A flow starts with $b_i$=1 and a utlity of 1. The flow also initially sets b_prev to SAME and prev_util=1. As indicated in the flow diagram of FIG. 3, the station invokes Adapt_b after transmitting k packets. In each invocation of Adapt_b, the station decides whether to increase, decrease or keep bi the same. The decision it makes is remembered until the next invocation of Adapt_b in a variable called b_prev. As part of making this decision, the station computes the current utility of the flow. The value of current utility is remembered until the next invocation of Adapt_b in a variable called prev_util.

In each invocation of Adapt_b, the station computes the average delay Di of the k packets and uses the above utility function to compute the curr_util. The station then compares the curr_util with prev_util to see if there has been a significant change. If the utility has improved considerably, then util_change is set to BETTER, if it is almost the same it is set to SAME, and to WORSE otherwise. If the util_change is BETTER (i.e., utility has improved since the last invocation), then the station assumes that its decision at the previous invocation was correct. Therefore, it takes the same decision (i.e, increase bi, decrease bi, or keep it the same) once again. On the other hand, if the utility has become worse (i.e, util_change is WORSE), the station does the opposite of the decision at the last invocation. Finally, if there is no significant change in the utility, then it chooses to keep bi the same.

Thus, as can be seen, the method and apparatus of the present invention retain the simplicity and efficiency of CSMA/CA but with the benefit of prioritized access. In this manner then a station's data packet's delay sensitivity, bandwidth demands and error tolerance are taken into account.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. A method of setting a priority for a plurality of streams awaiting transmission from a single station in a CSMA/CA wireless network, the method comprising:

determining a previous value change of the priority of a stream, where the stream is one of the plurality of streams awaiting transmission from the single station;

determining a previous of a utility function of the stream;

determining a current value of a utility function of the stream;

adapting the priority of the stream on a basis of the previous value change of the priority of the stream and a change between the previous value and the current value of the utility function of the stream.

2. The method of claim 1, wherein if it is determined that the previous value change of the priority of the stream was an increase, and if it is determined that the change between the previous value and the current value of the utility function of the stream is better, then the priority of the stream is increased.

3. The method of claim 1, wherein in the case where there is at least two streams awaiting transmission, selecting the stream from among the at least two streams with the highest priority.

* * * * *